(12) United States Patent
Hattori

(10) Patent No.: US 6,445,366 B1
(45) Date of Patent: Sep. 3, 2002

(54) STEREOSCOPIC DISPLAY

(76) Inventor: Tomohiko Hattori, 28, 1, Daikou 3-chome, Higashi-ku, Nagoya-shi, Aichi-ken (JP)

( * ) Notice: Subject to any disclaimer, the term of this patent is extended or adjusted under 35 U.S.C. 154(b) by 0 days.

(21) Appl. No.: 08/426,131

(22) Filed: Apr. 21, 1995

(30) Foreign Application Priority Data

Jun. 20, 1994 (JP) .............................................. 6-162684
Oct. 6, 1994 (JP) .............................................. 6-270374
Nov. 22, 1994 (JP) .............................................. 6-312736

(51) Int. Cl.[7] .............................................. H04N 13/04
(52) U.S. Cl. ............................. 345/55; 348/55; 348/46; 348/42; 348/43; 348/44
(58) Field of Search ............................. 345/7–9; 348/42, 348/51, 52, 55, 56, 59, 244; 359/15

(56) References Cited

U.S. PATENT DOCUMENTS

| | | | | |
|---|---|---|---|---|
| 3,959,580 A | * | 5/1976 | Chocol et al. ................ | 348/42 |
| 4,562,463 A | * | 12/1985 | Lipton ......................... | 348/56 |
| 4,649,425 A | * | 3/1987 | Pund ........................... | 348/52 |
| 4,750,014 A | * | 6/1988 | Frank .......................... | 396/287 |
| 4,799,739 A | * | 1/1989 | Newswanger ................. | 359/15 |
| 4,893,183 A | * | 1/1990 | Nayar .......................... | 348/135 |
| 4,945,408 A | * | 7/1990 | Medina ........................ | 348/42 |
| 4,987,487 A | * | 1/1991 | Ichinose et al. .............. | 348/59 |
| 5,140,445 A | * | 8/1992 | Takashima et al. ......... | 348/244 |
| 5,311,220 A | * | 5/1994 | Eichenlaub .................. | 348/55 |
| 5,315,377 A | * | 5/1994 | Isono et al. .................. | 348/51 |
| 5,349,379 A | * | 9/1994 | Eichenlaub .................. | 348/59 |
| 5,367,315 A | * | 11/1994 | Pan ............................. | 345/156 |
| 5,421,589 A | * | 6/1995 | Monroe ....................... | 345/9 |

FOREIGN PATENT DOCUMENTS

| | | |
|---|---|---|
| EP | 262 955 | 4/1988 |
| EP | 354 851 | 2/1990 |
| EP | 601 308 | 10/1993 |
| GB | 2 272 597 | 5/1994 |

OTHER PUBLICATIONS

The Art of Light revealed, Stereoscopic Graphics at Eurographics 1992, Dr. S. R. Lang, Image Technology (1993).*
The Implementation of A Multi–View Autostereoscopic Display, J. R. Moore, A. R. L. Travis, S. R. Lang, and O. M. Castle, Stereoscopic Television, IEEE Colloquium, 1992.*
Position sensing using an optical potentiometer, Lang S. R., Ryan D. J., Bobis J. P., Instrumentation and Measurement, IEEE Transactions on, vol.: 41 (1992).*
Sensors for Structural Displacement Measurerment, Lang S. R., Pauschke J. M., Ryan D. J., Optical Fiber Sensors Conference (1992).*
Moore et al: "The Implementation of a Multi–View Autostereoscopic Display", Image Technology (Journal of the BKSTS), vol. 75, No. 1 Jan. 1, 1993, pp. 6–7, 9–11, XP000335857.

* cited by examiner

Primary Examiner—Thomas Black
Assistant Examiner—Michael B. Holmes
(74) Attorney, Agent, or Firm—Pillsbury Winthrop LLP

(57) ABSTRACT

A thin stereoscopic display which enables plural persons to simultaneously observe stereoscopic images includes a color liquid crystal plate for displaying stereo-pairs composed of left and right eye perspectives in time-interlaced manner, a monochrome liquid crystal TV display disposed behind the color liquid crystal plate for displaying binary and inverted binary images a right or left half of the face of each observer so as to be synchronized with the time-interlaced display of the color liquid crystal plate, and an arrayed convex lens disposed between the color liquid crystal plate and the monochrome liquid crystal TV display so as to focus the observers' optical images on the screen of the monochrome liquid crystal TV display in geometrical agreement with the observers' face images displayed thereby. The arrayed convex lens distributes light emitted from the binary and inverted binary images of the half of the face of each observer to the left and right eyes of each observer through the color liquid crystal plate, respectively, whereby the left and right eye perspectives of the stereo-pairs displayed by the liquid crystal plate reach the left and right eyes of each observer, respectively.

23 Claims, 7 Drawing Sheets

STEREOSCOPIC DISPLAY

The following priority applications, Japanese Patent Application No. Hei 6-162684, filed in Japan on Jun. 20, 1994; Japanese Patent Applicaton No. Hei 6-270374, filed in Japan on Oct. 6, 1994; and Japanese Patent Application No. Hei 6-312736, filed in Japan on Nov. 22, 1994 are hereby incorporated by reference into the present specification.

BACKGROUND OF THE INVENTION

1. Field of the Invention

The present invention relates to a stereoscopic display which enables observation of stereoscopic images without wearing special glasses or the like.

2. Description of Related Art

The present inventor has already proposed one stereoscopic display (U.S. patent application Ser. No. 08/135,482). This device includes a color liquid crystal plate for displaying stereo-pairs composed of right and left eye perspectives in time-interlaced manner, a monochrome TV display for displaying face images of each observer, and a large convex lens for directing the right and left eye perspectives to respective right and left eyes of each observer based on the face images of the monochrome TV display.

This device enables simultaneous observation of stereoscopic images by plural persons without wearing special glasses. This device, however, has a problem in that the distance between the large convex lens and the monochrome TV display is large, because the large convex lens has a large focal length, thereby increasing the depth of the device undesirably.

SUMMARY OF THE INVENTION

It is an object of the present invention to provide a thin stereoscopic display having a reduced depth, which enables simultaneous observation of stereoscopic images by plural persons without wearing special glasses or the like.

The stereoscopic display in accordance with the present invention includes stereo-pairs display means for selectively displaying stereo-pairs composed of right and left eye perspectives to be observed by observers, observers' face images display means for displaying observers' face images adapted to direct stereo-pairs displayed by the stereo-pairs display means to right and left eyes of the respective observers with accuracy, and arrayed focusing means for directing the stereo-pairs displayed by the stereo-pairs display means to right and left eyes of each observer based on the observers' face images displayed by the observers' face images display means. The arrayed focusing means is situated on the plane from which it focuses observers' optical images substantially on a screen of the observers' face images display means in geometrical agreement with the observers' face images displayed thereby.

In a first aspect of the invention, the stereo-pairs display means is composed of transparent type electro-optical spatial modulation elements disposed between the observers and the arrayed focusing means to display the stereo-pairs in time-interlaced state, and the observers' face images display means is composed of a surface light source unit disposed behind the arrayed focusing means to display pairs of observers' face images of which flashing regions are substantially inverted in time-interlaced manner. The transparent type electro-optical spatial modulation elements selectively use one of each pair of observers' face images displayed by the surface light source unit as back light so as to be synchronized with the time-interlaced display thereof. Preferably embodiment, the surface light source unit is composed of a surface light source of which flashing regions are vdriable so as to be synchronized with the time-interlaced display of the electro-optical spatial modulation elements. More preferably, the surface light source unit is composed of at least one light source and transparent type electro-optical spatial modulation elements provided on a light emission side of the at least one light source.

In a second aspect of the invention, the stereo-pairs display means is composed of transparent type electro-optical spatial modulation elements disposed between the observers and the arrayed focusing means to display the stereo-pairs in time-parallel state, and the observers' face images display means is composed of a surface light source unit which is disposed behind the arrayed focusing means to display pairs of observers' face images of which polarization axes are oriented approximately 90° with respect to each other. The transparent type electro-optical spatial modulation elements selectively use one of each pair of observers' face images displayed by the surface light source unit as back light. In a preferred embodiment, the surface light source unit includes a surface light source of which variable regions for emitting light rays of polarization axes oriented approximately 90° with respect to each other, or includes a surface light source of which variable flashing regions and a polarization plate of which polarization axes are oriented approximately 90° so as to correspond to the displayed pairs of observers' face images. In the latter case, the surface light source unit is composed of a monochrome liquid crystal TV display, and in the polarization plate of the monochrome liquid crystal TV display, two kinds of regions of which polarization axes are oriented approximately 90° with respect to each other are distributed with uniformity.

In the second aspect of the invention, the transparent type electro-optical spatial modulation elements can be composed of a color liquid crystal image display plate wherein regions displaying left eye perspectives and those displaying right eye perspectives are alternately distributed with uniformity, and a polarizer on an input side thereof has such a member as to rotate polarization axes approximately 90° so as to correspond to the above regions of the color liquid crystal image display plate.

In a third aspect of the invention, the stereo-pairs display means is composed of transparent type electro-optical spatial modulation elements disposed between observers and the arrayed focusing means to display stereo-pairs in time-parallel state, and the observers' face images display means is composed of a surface light source unit disposed behind the arrayed focusing means to display pairs of observers' face images of which flashing regions are substantially inverted in time-interlaced manner. The transparent type electro-optical spatial modulation elements selectively use one of each pair of observer's face images displayed by the surface light source unit as back light so as to be synchronized with the time-interlaced display of the surface light source unit. In addition, an electro-optical spatial modulation element is further disposed between the surface light source unit and the spatial modulation elements for rotating the polarization axes of the pairs of observers' face images displayed by the surface light source unit approximately 90° so as to be synchronized with the time-interlaced display of the surface light source unit.

In a fourth aspect of the invention, the stereo-pairs display means is composed of transparent type electro-optical spatial modulation elements disposed between the observers and the arrayed focusing means to display the stereo-pairs in time-interlaced state, and the observers' face images display means is composed of a surface light source unit disposed behind the arrayed focusing means to display pairs of observers' face images of which polarization axes are oriented approximately 90° with respect to each other. In addition, a transparent type electro-optical spatial modulation element is further disposed between the surface light source unit and the spatial modulation elements for rotating the polarization axes of the pairs of observers' face images displayed by the surface light source unit approximately 90° so as to be synchronized with the time-interlaced display by the transparent type electro-optical spatial modulation elements.

The stereoscopic display of the present invention can include taking means disposed in the vicinity of the arrayed focusing means for taking observers' face images continuously.

In addition, the stereoscopic display of the present invention can include illuminating means disposed on at least one of right and left sides of the observers for illuminating observers' faces from at least one side thereof.

In addition, the stereoscopic display of the present invention can include image modulation processing means for forming binary images based on the observers' face images taken by the taking means, and inputting the formed binary images into the observers' face images display means.

With the stereoscopic display in accordance with the present invention, by providing the arrayed focusing means on the plane from which it focuses observers' optical images substantially on the observers' face images display means in geometrical agreement with observers' face images displayed thereby, the stereo-pairs displayed by the stereo-pairs display means in time-interlaced or time-parallel manner are directed selectively to left and right eyes of the respective observers with accuracy, while back-lit by the observers' face images of the observers' face images display means. Since the focusing means has an arrayed configuration of which the focal length is less than that of a conventionally used large convex lens, the overall size of device in the direction of depth can be reduced. Any person positioned within the area where observers' optical images can be focused by the arrayed focusing means substantially on the screen of the observers' face images display means can observe stereoscopic images. Furthermore, he or she can observe such stereoscopic images continuously while moving his or her observation position unless he or she is outside of the above area. In addition, plural persons can observe stereoscopic images simultaneously.

Other objects, features, and characteristics of the present invention will become apparent upon consideration of the following description and the appended claims with reference to the accompanying drawings, all of which form a part of this specification.

DETAILED DESCRIPTION OF THE PRESENTLY PREFERRED EXEMPLARY EMBODIMENTS

Figure 1:
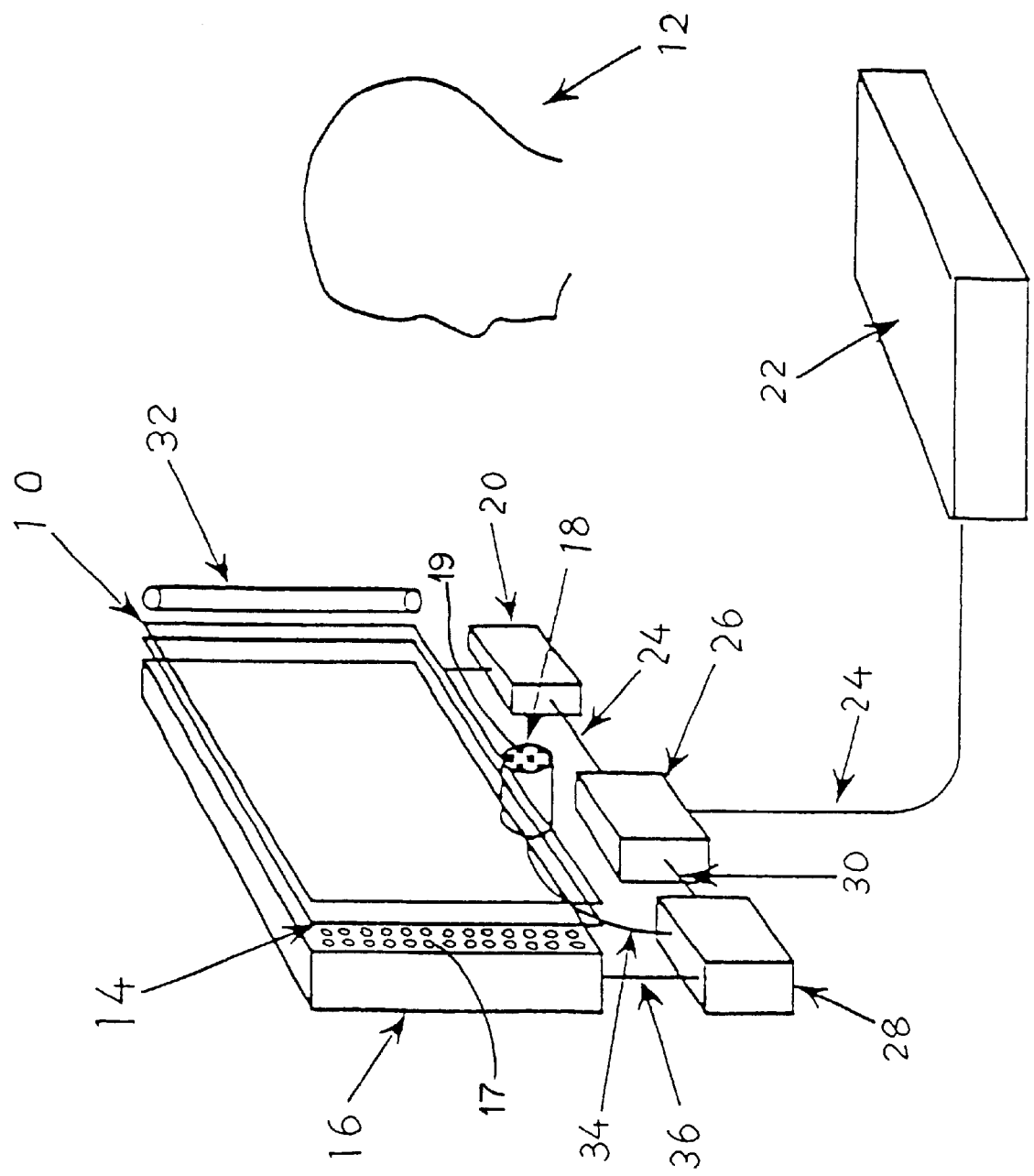
FIG. 1 is a schematic view of a first embodiment of a stereoscopic display in accordance with the present invention.
Figure 2:
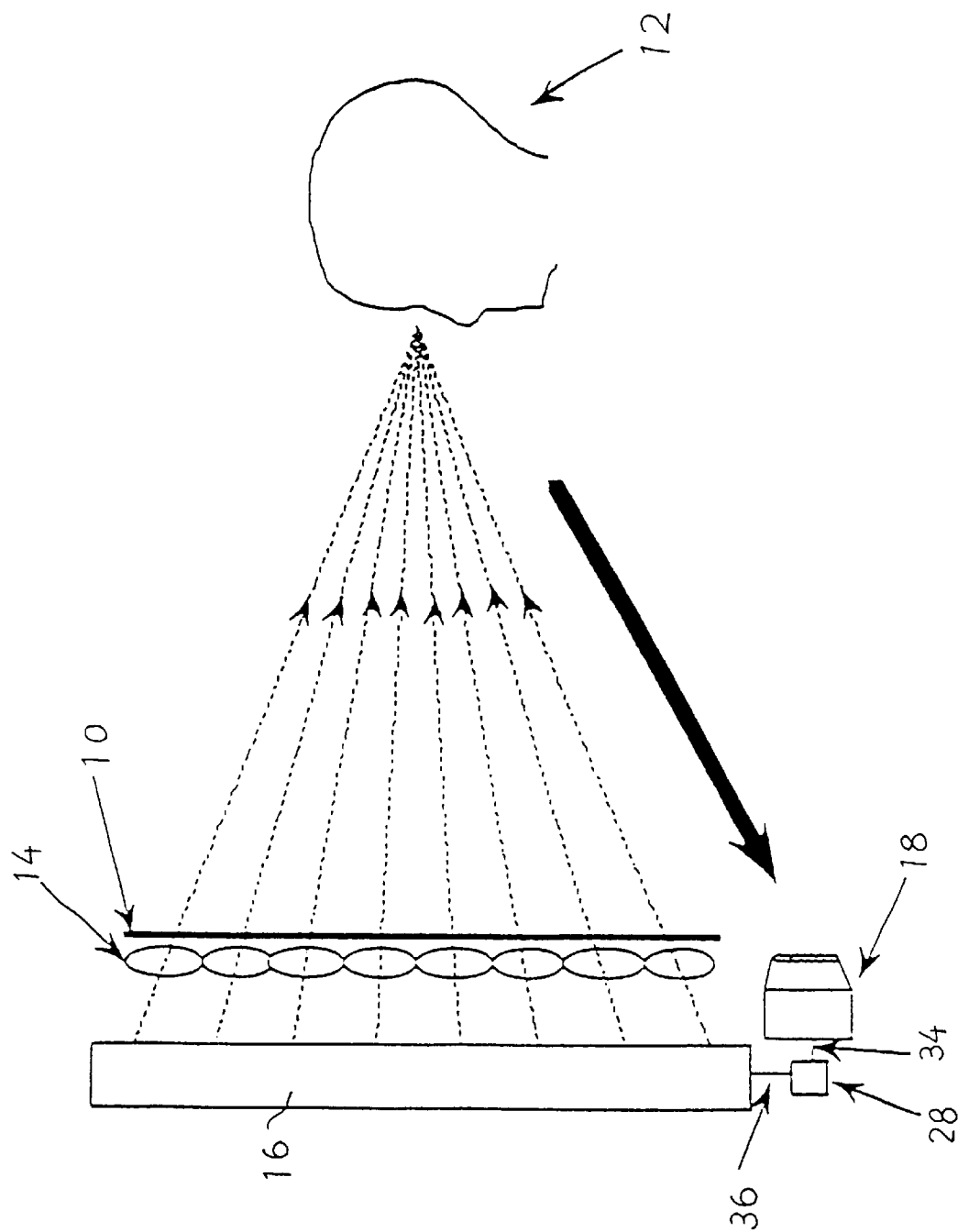
FIG. 2 is a side view illustrating vertical optical paths of the first embodiment.
Figure 3:
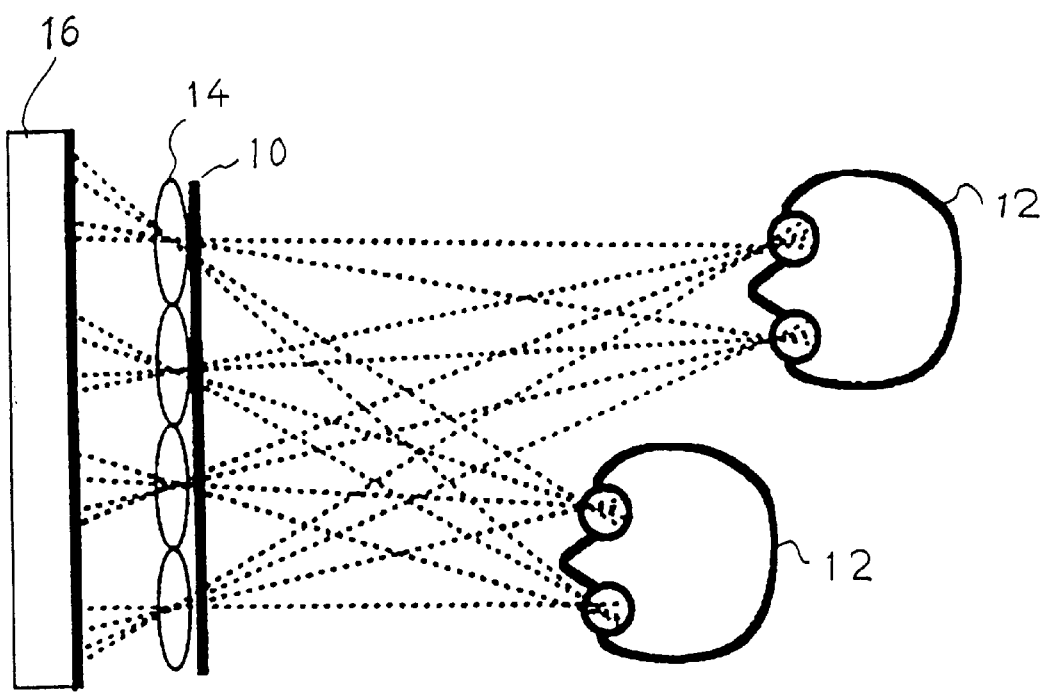
FIG. 3 is a plan view illustrating horizontal optical paths of the first embodiment.

FIGS. 1, 2 and 3 illustrate a first embodiment in accordance with the present invention. As shown, a color liquid crsytal plate 10 is disposed such that a screen thereof faces observers 12.

An arrayed convex lens 14 is disposed behind the color liquid crystal plate 10, and a monochrome liquid crystal TV display 16 is disposed such that a screen 17 thereof faces the arrayed convex lens 14 on the plane on which the arrayed convex lens 14 substantially focuses optical images of each observer 12. A polarization plate as an analyzer is detached from the monochrome liquid crystal TV display 16.

An infrared TV camera 18 is disposed under the arrayed convex lens 14 such that an arrayed taking lens 19 thereof faces the observers 12. The arrayed taking lens 19 has an arrangement similar to that of the arrayed convex lens 14.

A matrix circuit 20 is connected to the color liquid crystal plate 10 to drive pixels thereof. A video tape recorder 22 which outputs a stereo-pairs signal 24 is connected to the matrix circuit 20 by way of a stereoscopic synchronizing signal sampling circuit 26, whereby the stereo-pairs signal 24 is input to the matrix circuit 20.

Observers' face images taken by the infrared TV camera 18 are input to a binary images forming circuit 28 to drive pixels of the monochrome liquid crystal TV display 16 in synchronization with a stereoscopic shynchronizing signal 30 output from the stereoscopic synchronizing signal sampling circuit 26. Furthermore, an infrared light source 32 is disposed on the obliquely right side of the observer 12.

The color liquid crystal plate 10 serves as the stereo-pairs display means, the monochrome liquid crystal TV display serves as the surface light source unit of the observers' face images display means which displays pairs of observers' face images of which flashing regions are variable and substantially inverted in time-interlaced manner, and the arrayed convex lens 14 serves as the arrayed focusing means.

In operation, the stereo-pairs signal 24 from the video tape recorder 22 is input to the color liquid crystal plate 10 by way of the surface light stereoscopic synchronizing signal sampling circuit 26 and the matrix circuit 20, whereby the color liquid crystal plate 10 displays stereo-pairs, each composed of right and left eye perspectives.

Each observer 12 illuminated by the infrared light source 32 from the obliquely right side thereof is continuously taken by the infrared TV camera 18, and half face images of each observer 12, of which right half faces are bright while left half faces are dark, are obtained. Since the taking lens of the infrared TV camera 18 has an arrayed configuration similarly to the arrayed convex lens 14, the obtained half face images of each observer 12 are arranged similarly to the arrayed convex lens 14.

The binary images forming circuit 28 outputs a binary and inverted binary images signal 36 based on an observer's face images signal 34 indicating the half face images of each observer 12 to the monochrome liquid crystal TV display 16 in time-interlaced manner in synchronizating with the stereoscopic shynchronizing signal 30 from the stereoscopic synchronizing signal sampling circuit 26, whereby the screen of the monochrome liquid crystal TV display 16 displays observers' face images composed of binary and inverted binary images in time-interlaced manner.

The arrayed convex lens 14 focuses plural optical images of each observer 12 substantially on the screen of the monochrome liquid crystal TV display 16.

The arrayed convex lens 14 and the taking lens 19 of the infrared TV camera 18 are disposed such that the plural optical images of each observer 12 are superimposed on the observer's binary and inverted binary images on the screen of the monochrome liquid crystal TV display 16 in geometrical agreement thereto.

Furthermore, the monochrome liquid crystal TV display 16 is synchronized with the color liquid crystal plate 10 such that when the color liquid crystal plate 10 displays left eye perspectives, for example, the polarization axes of light rays emitted from the observer's left half face images on the screen of the monochrome liquid crystal TV display 16 are aligned with those of the polarizer of the color liquid crystal plate 10.

Thus, only the light rays emitted from the observer's left half face images serve as back light for the left eye perspectives of the color liquid crystal plate 10. The arrayed convex lens 14 focuses the bright left half face images from the monochrome liquid crystal TV display 16 on a left face of each observer 12 so that the above back light enters a left eye of each observer 12 selectively. This results in the left eye perspectives being seen only by the left eye of each observer 12. Likewise, the right eye perspectives are seen only by his right eye, whereby he can observe stereoscopic images without wearing any special glasses.

As described above, any observer can observe stereoscopic images without wearing any special glasses provided that he is taken by the infrared TV camera 18 while being illuminated by the infrared light source 32 from his obliquely right side within the area where the arrayed convex lens 14 can focus the observer's optical images substantially on the screen of the monochrome liquid crystal TV display 16. He can also observe the stereoscopic images continuously while moving his location, unless he moves outside of the above area. Furthermore, plural persons can see the stereoscopic images simultaneously, as shown in FIG. 3 (in the drawing, a four-arrayed convex lens 14 is used).

In the present embodiment, the analyzer is detached from the monochrome liquid crystal TV display 16. Alternatively, a normal monochrome liquid crystal TV display having an analyzer may be employed. In this case, the polarizer of the color liquid crystal plate 10 is detached therefrom, or the polarization axes of the polarizer of the color liquid crystal plate 10 are substantially aligned with those of the analyzer of the normal monochrome liquid crystal TV display.

Furthermore, instead of the monochrome liquid crystal TV display, any means capable of outputing two dimensional images including at least three primary colors, such as a plasma display, neon tubing display, solid state light emitting element, thin CRT or arrayed CRT, may be employed.

Figure 4:
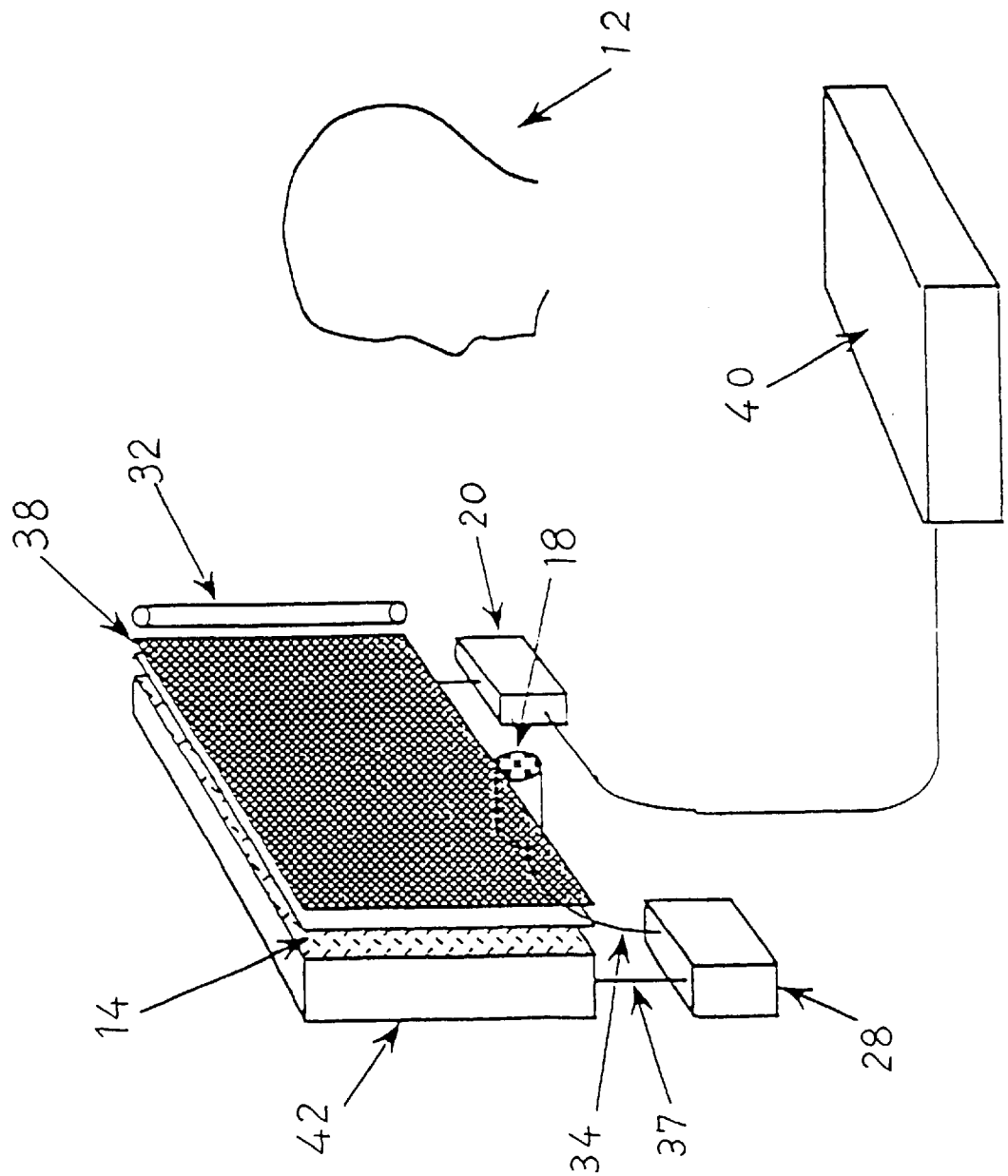
FIG. 4 is a schematic view of a second embodiment of a stereoscopic display in accordance with the present invention.
Figure 5:
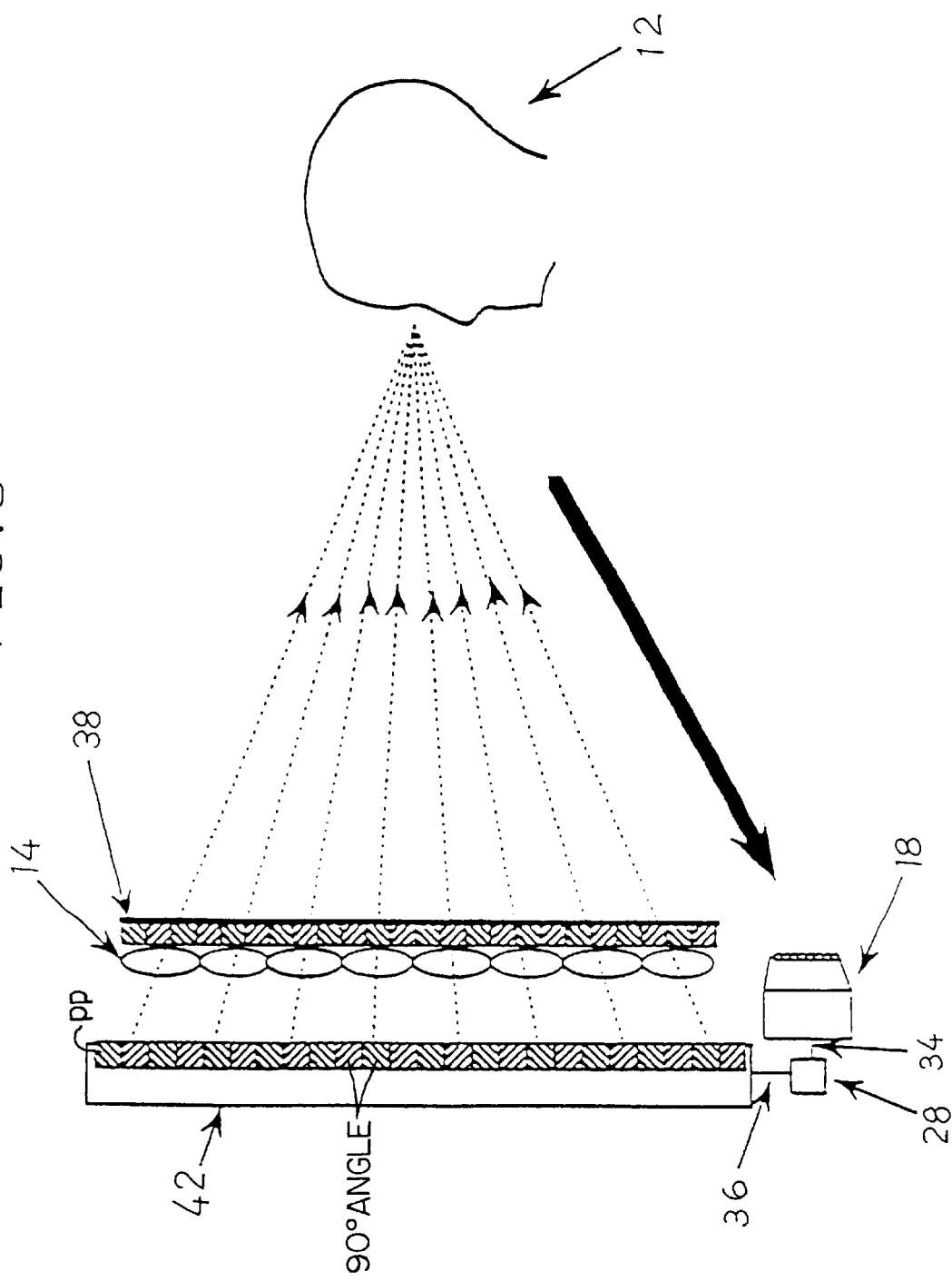
FIG. 5 is a side view illustrating optical paths of the second embodiment.

FIGS. 4 and 5 illustrate a second embodiment in accordance with the present invention. As shown, a color liquid crystal plate 38 is disposed such that a screen thereof faces observers 12. The color liquid crystal plate 38 is connected to a video tape recorder 40 by way of a matrix circuit 20, whereby right and left eye perspectives composing stereopairs are output from the video tape recorder 40 to the color liquid crystal plate 38 in time-parallel manner. Thus, the color liquid crystal plate 38 displays the right and left eye perspectives in time-parallel and spatial-multiplex state. More specifically, alternate rows or columns of pixels (in FIG. 5, every row of pixels) of the color liquid crystal plate 38 display the right and left eye perspectives.

A polarizer of the color liquid crystal plate 38 has an arrangement that polarization axes thereof are oriented approximately 90° with respect to each other so as to correspond to the above-described row or column of pixels of the color liquid crystal plate 38, whereby right eye perspectives display row or column and left eye perspectives display row or column, each having polarization axes different from each other, are alternately arranged in the polarizer of the color liquid crystal plate 38.

An arrayed convex lens 14 is disposed behind the color liquid crystal plate 38. And a monochrome liquid crystal TV display 42 is disposed such that a screen thereof faces the arrayed convex lens 14 on the plane on which the observers' optical images are substantially focused by the arrayed convex lens 14. The monochrome liquid crystal TV display 42 has a polarization plate of which polarization axes are alternately oriented approximately 90° with respect to each other so as to correspond to rows or columns of pixels of the monochrome liquid crystal TV display 42 substantially in alignment with the opposed polarization axes of the polarizer of the color liquid crystal plate 38.

Furthermore, an infrared TV camera 18 having an arrayed taking lens and an infrared light source 32 are disposed in the vicinity of the arrayed convex lens 14 like the first embodiment. An observers' face images signal 34 obtained by the infrared TV camera 18 is input to a binary images signal forming circuit 28 to be converted to a binary and inverted binary images signal. The binary images signal forming circuit 28 outputs a composite signal 37 to the monochrome liquid crystal TV display 42 such that rows or columns of pixels thereof alternately display binary and inverted binary images in time-parallel state. This results in observers' face images, each being composed of binary right and left half face images, being displayed alternately by rows or columns of pixels of the monochrome liquid crystal TV display 38.

The infrared light source 32 and the binary images forming circuit 28 are adjusted such that the polarization axes of the rows or columns of pixels of the monochrome liquid crystal TV display 38, which display the left half face images, are substantially aligned with those of the left eye perspectives display rows or columns of the color liquid crystal plate 38 while the polarization axes of the rows or columns of pixels which display the right half face images are substantially aligned with those of the right eye perspectives display rows or columns of the color liquid crystal plate 38.

Furthermore, the positions or the like of the arrayed convex lens 14 and the taking lens of the infrared TV camera 18 are adjusted such that the plural optical images of each observer 12 are superimposed substantially on the observer's half face images of the monochrome liquid crystal TV display 42.

The color liquid crystal plate 38 serves as the stereo-pairs display means, and the monochrome liquid crystal TV display 42 serves as the surface light source unit of the observers' face images display means, which displays pairs of observers' face images, the polarization axes thereof being oriented approximately 90° with respect to each other, and includes a surface light source of which flashing regions are variable and two polarization plates of which polarization axes are oriented approximately 90° so as to correspond to the displayed pairs of observers' face images.

In operation, the light rays emitted from the observers' left half face images on the monochrome TV display 42, for example, are transmitted only by the left eye perspectives display rows or columns of the color liquid crystal plate 38, of which the polarization axes are substantially aligned with those of the light rays emitted from the observers' left half face images of the monochrome TV display 42, thereby serving as back light for the left eye perspectives of the color liquid crystal plate 38. Since the left half face images, for example, are focused by the arrayed convex lens 14 on a left half face of each observer 12, the left eye perspectives which are back-lighted by the light rays emitted from the observers' left half face images of the monochrome TV display 42 selectively enter a left eye of each observer 12. Likewise, the right eye perspectives displayed by the color liquid crystal plate 38 selectively enter a right eye of each observer 12.

Thus, each observer 12 can observe stereoscopic images. Furthermore, each observer 12 can observe stereoscopic images continuously while moving his observation position unless he is outside of the area described in the first embodiment. In addition, plural observers can observe stereoscopic images simultaneously like the first embodiment.

In the present embodiment, the polarization axes of alternate rows or columns of pixels of the polarization plate of the monochrome liquid crystal TV display are oriented approximately 90° with respect to each other. Alternatively, any other arrangement will do if the polarization axes corresponding to the binary half face images displaying pixels are oriented approximately 90° with respect to those corresponding to the inverted binary half face images displaying pixels.

Furthermore, a normal monochrome liquid crystal TV display may be employed. In this case, about one half of a surface of the analyzer thereof is covered with a polarizing material which enables the rotation of the polarization axes approximately 90° with respect to each other.

Instead of the monochrome liquid crystal TV display, a monochrome CRT may be employed. In this case, a polarization plate of which poralization axes are oriented similarly to the present invention is disposed on a screen of the monochrome CRT.

Instead of the monochrome liquid crystal TV display of the present embodiment, the monochrome liquid crystal TV display from which an analyzer is detached may be employed. In this case, the binary half face images and their inverted binary images need not be displayed on the screen of the monochrome liquid crystal TV display in spatial-multiplexing state. Either the binary half face images or their inverted binary images will do.

In the present embodiment, the stereo-pairs are input to the color liquid crystal plate from the video tape recorder in time-parallel mariner. Alternatively, two image signals may be input in spatial-multiplexing manner.

Figure 6:
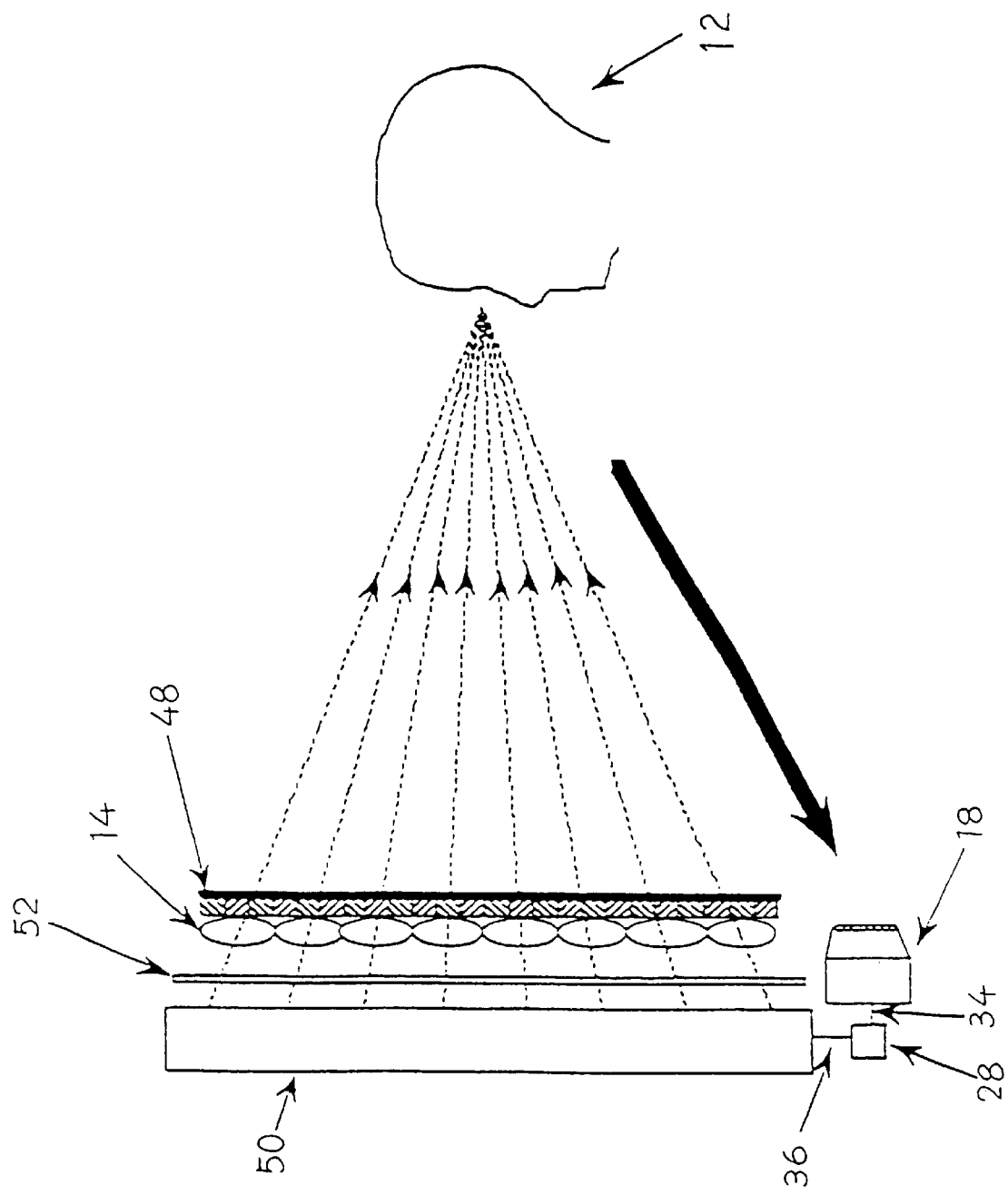
FIG. 6 is a side view illustrating optical paths of a third embodiment of a stereoscopic display in accordance with the present invention.

FIG. 6 illustrates a third embodiment of the present invention. As shown, a color liquid crystal plate 48 substantially identical to the color liquid crystal plate 38 of the second embodiment is connected to a video tape recorder (not shown) which is substantially identical to that (40) of the second embodiment via a matrix circuit (not shown). Alternate rows or columns of pixels (in FIG. 6, alternate rows of pixels) of the color liquid crystal plate 48 display right and left eye perspectives input from the video tape recorder in spatial-multiplexing and time-parallel state. A polarizer disposed on a light input side of the color liquid crystal plate 48 includes right and left eye perspectives display rows or columns of which polarization axes are oriented approximately 90° with respect to each other so as to correspond to the rows or columns of pixels of the color liquid crystal plate 48. An arrayed convex lens 14 is disposed behind the color liquid crystal plate 48. A normal monochrome liquid crystal TV display 50 is disposed on the plane on which the optical images of each observer 12 are substantially focused by the arrayed convex lens 14 such that the polarization axes of the light rays emitting from the monochrome liquid crystal TV display 50 are substantially aligned with one of two polarization axes of the polarizer of the color liquid crystal plate 48.

An infrared TV camera 18 and an infrared light source (not shown) are disposed in the vicinity of the arrayed convex lens 14 like the preceding embodiments. An observer's images signal 34 is input to an binary images signal forming circuit 28. The binary images forming circuit 28 converts the observer's images signal 34 to a binary and inverted binary images signal 36 and inputs it to the monochrome liquid crystal TV display 50 in a time-interlaced manner.

In addition, a spatial modulation element 52 is further disposed between the monochrome liquid crystal TV display 50 and the arrayed convex lens 14 for rotating the polarization axes of transmitted light rays approximately 90° so as to be synchronized with the time-interlaced display of the binary and inverted binary images on the monochrome liquid crystal TV display 50.

The remainder of the structure of the device of the third embodiment is identical to that of the second embodiment. Accordingly, illustration and description thereof will be omitted.

The color liquid crystal plate 48 serves as the stereo-pairs display means, and the monochrome liquid crystal TV display 50 serves as the surface light source unit of the observers' face images display means, which displays pairs of observers' face images of which flashing regions are substantially inverted in time-interlaced manner.

In operation, the polarization axes of the light rays emitted from a screen of the monochrome liquid crystal TV displays 50 in time-interlaced manner are rotated approximately 90° by the spatial modulation element 52. Namely, when the observers' left half face images emit light rays, for example, the polarization axes thereof are rotated approximately 90° by the spatial modulation element 52 substantially in alignment with those of the left eye perspectives to display rows of the polarization plate of the color liquid crystal plate 48. Accordingly, the light rays emitted from the observers' left half face images on the monochrome liquid crystal TV display 50 pass the left eye perspectives display rows of the color liquid crystal plate 48 and act as back light selectively for the color liquid crystal plate 48. In this case, the observers' left half face images are focused substantially on a left half face of each observer 12 by the arrayed convex lens 14. This causes the light rays emitted from the observers' left half face images to be converged by the arrayed convex lens 14 and enter a left eye of each observer 12, whereby the left eye perspectives displayed by the color liquid crystal plate 48 are seen only by the left eye of each observer 12. Likewise, the right eye perspectives displayed by the color liquid crystal plate 48 are seen only by a right eye of each observer 12. Thus, each observer 12 can observe stereoscopic images. Furthermore, he can observe the stereoscopic images continuously if he moves his observation position, and plural observers can observe the stereoscopic images simultaneously like the preceding embodiments.

In the present embodiment, the monochrome liquid crystal TV display can be replaced with a monochrome CRT. In this case, either binary half face images or their inverted binary images may be displayed on the monochrome CRT.

Figure 7:
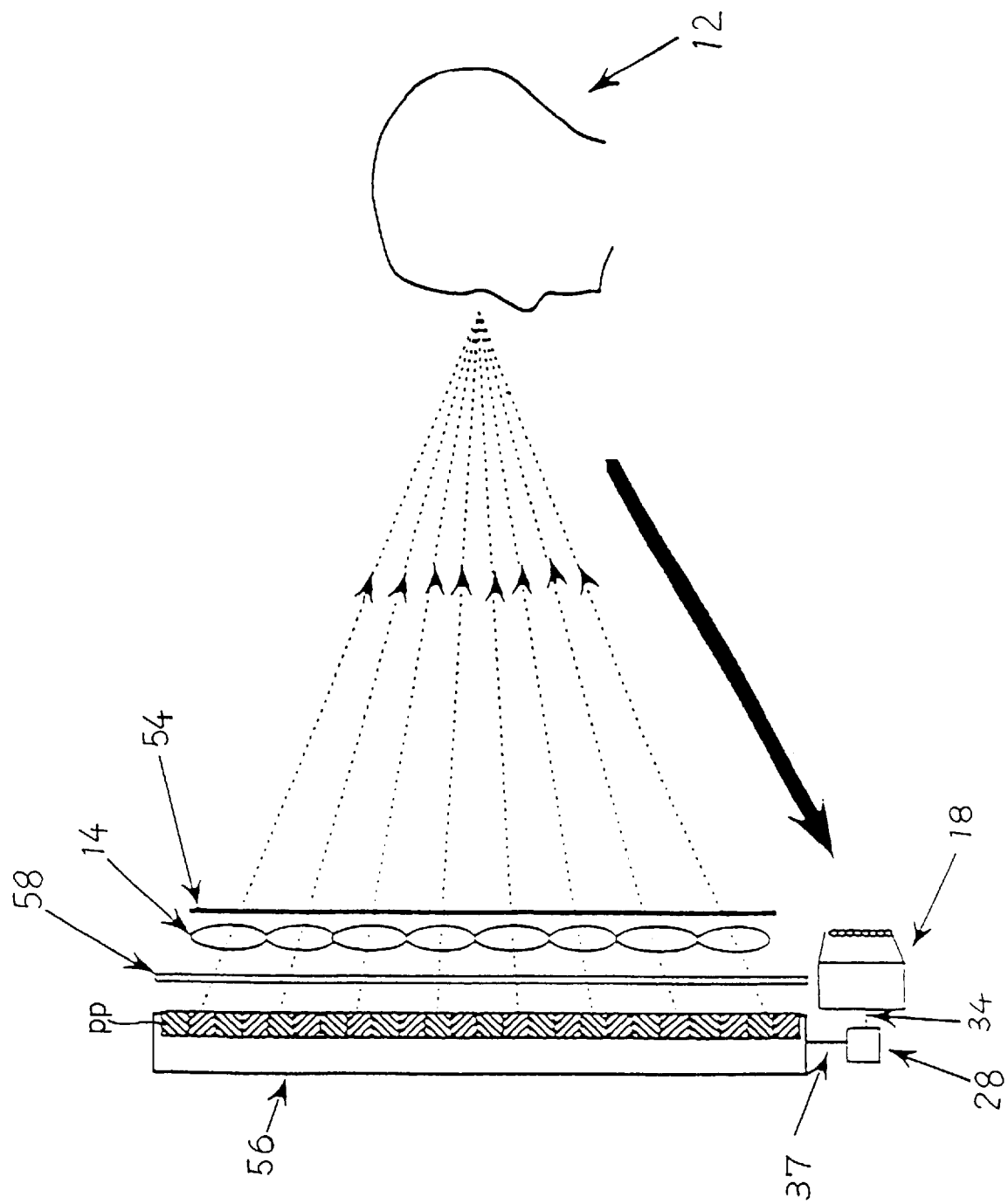
FIG. 7 is a side view illustrating optical paths of a fourth embodiment of a stereoscopic display in accordance with the present invention.

FIG. 7 illustrates a fourth embodiment of the present invention. As shown, a color liquid crystal plate 54 identical to the color liquid crystal plate 10 of the first embodiment is connected to a video tape recorder (not shown) identical to the video tape recorder 22 of the first embodiment via a matrix circuit (not shown) to display right and left eye perspectives input from the video tape recorder alternately in time-interlaced state. An arrayed convex lens 14 is disposed behind the color liquid crystal plate 54. A monochrome liquid crystal TV display 56 identical to the monochrome liquid crystal TV display 42 of the second embodiment is disposed on the plane on which optical images of each observer 12 are substantially focused by the arrayed convex lens 14. The polarization axes of the two polarization plates of the monochrome liquid crystal TV display 56 are oriented approximately 90° with respect to each other so as to correspond to alternate rows or columns of pixels (in the drawing, alternate rows of pixels) thereof. And one of the polarization axes of the two polarization plates is substantially aligned with the polarization axis of a polarizer of the color liquid crystal plate 54.

An infrared TV camera 18 and an infrared light source (not shown) are disposed in the vicinity of the arrayed convex lens 14 to output an observers' face images signal 34 to a binary images forming circuit 28 like the preceding embodiments. The signal 34 is converted to binary and inverted binary images, and a composite signal 37 is output to the monochrome liquid crystal TV display 56 such that alternate rows or columns of pixels of the monochrome liquid crystal TV display 56 display binary right half face images and binary left half face images of each observer 12.

In addition, a spatial modulation element 58 is further disposed between the monochrome liquid crystal TV display 56 and the arrayed convex lens 14 for rotating the polarization axes of the light rays emitted from the monochrome liquid crystal TV display 56 approximately 90° so as to be synchronized with the time-interlaced display of the right and left eye perspectives on the color liquid crystal plate 54.

The color liquid crystal plate 54 serves as the stereo-pairs display means, and the monochrome liquid crystal TV display 56 serves as the surface light source unit of the observers' face images display means, which displays pairs of observers' face images of which polarization axes are oriented approximately 90° with respect to each other.

In operation, the polarization axes of the light rays emitted from the screen of the monochrome liquid crystal TV display 56 are rotated approximately 90° by the spatial modulation element 58 in time-interlaced state. Namely, when the color liquid crystal plate 54 displays left eye perspectives, for example, the polarization axes of the light rays emitted from the left half face images are substantially aligned with those of the polarizer of the color liquid crystal plate 54.

Therefore, only when the color liquid crystal plate 54 displays left eye perspectives, the left half face images act as back light for the color liquid crystal plate 54. Since the observers' left half face images on the monochrome liquid crystal TV display 56 are focused on a left half face of each observer 12 by the arrayed convex lens 14, the light rays emitted from the left half face images as back light for the color liquid crystal plate 54 are converged by the arrayed convex lens 14 and enter a left eye of each observer 12. Thus, the left eye perspectives are seen only by the left eye of each observer 12. Likewise, the right eye perspectives of the color liquid crystal plate 54 are seen only by a right eye of each observer 12. As a result, each observer 12 can observe stereoscopic images similarly to the preceding embodiments. Furthermore, he can observe stereoscopic images continuously even if he moves his observation position, and plural persons can observe stereoscopic images simultaneously like the preceding embodiments.

In the fourth embodiment, the polarization axes of alternate rows or columns of pixels of the two polarization plates of the monochrome liquid crystal TV display are oriented approximately 90° with respect to each other. The present invention is not limited to this arrangement provided that the binary half face images and their inverted images are polarized to be oriented approximately 90° with respect to each other. The polarization axes of the polarization plates, for example, may be oriented approximately 90° so as to correspond to every pixel of the monochrome liquid crystal TV display. Furthermore, a normal monochrome liquid crystal TV display provided with polarization plates can be employed. In this case, about one half of the screen of the analyzer thereof is covered with a polarization material capable of rotating the polarization axes thereof approximately 90°.

The monochrome liquid crystal TV display may be replaced with such a monochrome CRT or the like as exemplified in the first embodiment. In this case, such a polarization plate as shown in the present embodiment is disposed on a screen of the monochrome CRT.

The monochrome liquid crystal TV display provided with two polarization plates can be replaced with another monochrome liquid crystal TV display from which an analyzer is detached. In this case, both binary face images and their inverted images need not be displayed on a screen of the monochrome liquid crystal TV display in spatial-multiplexing state. Either binary face images or their inverted images will do.

In the preceding embodiments, the arrayed convex lens may be replaced with an arrayed Fresnel convex lens or an arrayed Selfoc lens. Each arrayed lens is preferably composed of an integral lens, however, is not limited thereto. Furthermore, the arrayed convex lens may be replaced with a double integral lens array. The infrared TV camera as the taking means may be replaced with another TV camera which is sensitive to visible rays or ultraviolet rays. In this case, a light source emitting such rays is used as the illuminating means. The position and number of light sources can be arbitrarily selected. The arrayed lens as the taking lens of the TV camera may be replaced with a normal non-arrayed single lens. In this case, observers' face images taken by the TV camera are processed such that the monochrome liquid crystal TV display displays plural observers' face images so as to correspond to the observers' optical images focused by the arrayed convex lens. In case of the double integral lens array, a normal non-arrayed single lens will do as the taking lens, and such processing is not needed.

Furthermore, a half mirror may be provided on the optical axis of the arrayed lens such that a TV camera takes observers' images on the optical axis of the half mirror.

The TV camera may be replaced with another taking system using microwave or ultrasonic wave.

The TV camera may be also replaced with an automatically focusing camera which enables automatic adjustment of the distance between the monochrome liquid crystal TV display and the arrayed lens such that the observers' optical images are focused substantially on a screen of the monochrome liquid crystal TV display.

The discrimination of the right and left half faces of each observer may be carried out by using an image processing technique such as gravity wave detection.

In addition, in order to improve back light effect of the monochrome liquid crystal TV display, a large convex lens, Fresnel convex lens, Selfoc lens or arrayed lens thereof may be disposed on a screen of the monochrome liquid crystal TV display.

Furthermore, pairs of observers' binary face images to be displayed on the screen of the monochrome liquid crystal TV display need not be composed of binary face images and their inverted images. Alternatively, two binary face images may be respectively obtained by using two TV cameras.

The video tape recorder as the stereo-pairs forming means may be replaced with another member.

In the preceding embodiments, the stereoscopic display is used as a display for one-way communication from a video tape recorder. Alternatively, the display of the present invention can be used as a TV display, stereoscopic display for domestic, industrial or medical use, and as a display for two-way communication such as multimedia, game machines, TV telephones, virtual reality or the like.

While the invention has been described in connection with what are considered presently to be the most practical and preferred embodiments, it is to be understood that the invention is not limited to the disclosed embodiments, but, on the contrary, is intended to cover various modifications and equivalent arrangements included within the spirit and scope of the appended claims.

What is claimed is:

1. A stereoscopic display comprising:
   stereo-pairs display means for selectively displaying a plurality of stereo-pairs, each of said plurality of stereo-pairs comprising right and left eye perspectives to be observed by a respective plurality of observers;
   observers' face images display means for displaying a plurality of observers' face images, said observers' face images display means directing said plurality of stereo-pairs displayed by said stereo-pairs display means to respective ones and not the others of right and left eyes of said plurality of observers with accuracy; and
   arrayed focusing means for directing said plurality of stereo-pairs displayed by said stereo-pairs display means to said right and left eyes of said plurality of observers based on said plurality of observers' face images displayed by said observers' face images display means, said arrayed focusing means being provided on a plane from which said arrayed focusing means focuses an optical image of said plurality of observers substantially on a screen of said observers' face images display means in geometrical agreement with said plurality of observers' face images displayed thereby.

2. The stereoscopic display as claimed in claim 1, wherein:
   said stereo-pairs display means comprises a first plurality of transparent type electro-optical spatial modulation elements provided between said plurality of observers and said arrayed focusing means, said first plurality of transparent type electro-optical spatial modulation elements displaying said plurality of stereo-pairs in a time-interlaced state;
   said observers' face images display means comprises a surface light source unit provided behind said arrayed focusing means opposite said plurality of observers, said surface light source unit displaying a plurality of pairs of observers' face images having flashing regions which are substantially inverted in a time-interlaced state; and
   said first plurality of transparent type electro-optical spatial modulation elements use one of said plurality of pairs of observers' face images displayed by said surface light source unit as back light so as to be synchronized with said time-interlaced state of said flashing regions displayed by said surface light source unit.

3. The stereoscopic display as claimed in claim 2, wherein said surface light source unit comprises:
   a surface light source having flashing regions, said flashing regions being variable so as to be synchronized with said time-interlaced state of said electro-optical spatial modulation elements.

4. The stereoscopic display as claimed in claim 2, wherein said surface light source unit comprises:
   at least one light source; and
   a second plurality of transparent type electro-optical spatial modulation elements provided on a light emitting side of said at least one light source.

5. The stereoscopic display as claimed in claim 1, wherein:
   said stereo-pairs display means comprises a first plurality of transparent type electro-optical spatial modulation elements provided between said plurality of observers and said arrayed focusing means, said first plurality of transparent type electro-optical spatial modulation elements displaying said plurality of stereo-pairs in a time-parallel state;
   said observers' face images display means comprises a surface light source unit provided behind said arrayed focusing means opposite said plurality of observers, said surface light source unit displaying a plurality of pairs of observers' face images having polarization axes which are oriented approximately 90° with respect to each other; and
   said first plurality of transparent type electro-optical spatial modulation elements selectively use one of each pair of said plurality of pairs of observers' face images displayed by said surface light source unit as back light.

6. The stereoscopic display as claimed in claim 5, wherein said surface light source unit comprises:
   a surface light source having variable regions for emitting light rays having polarization axes oriented approximately 90° with respect to each other.

7. The stereoscopic display as claimed in claim 5, wherein said surface light source unit comprises:
   a surface light source having flashing regions, said flashing regions being variable, and said surface light source having a polarization plate having respective polarization axes which are oriented approximately 90° with respect to each other so as to correspond to said displayed plurality of pairs of observers' face images.

8. The stereoscopic display as claimed in claim 7, wherein:

said surface light source unit comprises a monochrome liquid crystal TV display; and said polarization plate having two kinds of regions in which polarization axes are oriented approximately 90° with respect to each other, said two kinds of regions being distributed with uniformity.

9. The stereoscopic display as claimed in claim 5, wherein said plurality of transparent type electro-optical spatial modulation elements comprise:

a color liquid crystal image display plate having a plurality of left eye perspectives display regions and a respective plurality of right eye perspectives display regions distributed with uniformity, said color liquid crystal image display plate including a polarizer on an input side thereof having such a member as to rotate polarization axes approximately 90° so as to correspond to said plurality of left eye perspectives display regions and said respective plurality of right eye perspectives display regions of said color liquid crystal image display plate.

10. The stereoscopic display as claimed in claim 1, wherein:

said stereo-pairs display means comprises a plurality of transparent type electro-optical spatial modulation elements provided between said plurality of observers and said arrayed focusing means to display said plurality of stereo-pairs in a time-parallel state;

said observers' face images display means comprises a surface light source unit provided behind said arrayed focusing means opposite said plurality of observers, said surface light source unit displaying a plurality of pairs of observers' face images having flashing regions which are substantially inverted in a time-interlaced state; and said plurality of transparent type electro-optical spatial modulation elements selectively use one of said plurality of pairs of observers' face images displayed by said surface light source unit as back light so as to be synchronized with said time-interlaced state of said flashing regions displayed by said surface light source unit;

said stereoscopic display further comprising:

a transparent type electro-optical spatial modulation element provided between said surface light source unit and said plurality of transparent type electro-optical spatial modulation elements for rotating polarization axes of said plurality of pairs of observers' face images displayed by said surface light source unit approximately 90° so as to be synchronized with said time-interlaced state of said flashing regions displayed by said surface light source unit.

11. The stereoscopic display as claimed in claim 1, wherein:

said stereo-pairs display means comprises a plurality of transparent type electro-optical spatial modulation elements provided between said plurality of observers and said arrayed focusing means to display said plurality of stereo-pairs in a time-interlaced state; and said observers' face images display means comprises a surface light source unit provided behind said arrayed focusing means opposite said plurality of observers, said surface light source unit displaying a plurality of pairs of observers' face images having polarization axes which are oriented approximately 90° with respect to each other;

said stereoscopic display further comprising:

a transparent type electro-optical spatial modulation element provided between said surface light source unit and said plurality of transparent type electro-optical spatial modulation elements for rotating polarization axes of said plurality of pairs of observers' face images displayed by said surface light source unit approximately 90° so as to be synchronized with said time-interlaced state of said spatial modulation elements.

12. The stereoscopic display as claimed in claim 1, further comprising:

observers' face taking means provided in a vicinity of said arrayed focusing means for continuously capturing images of said observers' faces.

13. The stereoscopic display as claimed in claim 12, further comprising:

illuminating means provided on at least one of a right side and a left side of said plurality of observers.

14. The stereoscopic display as claimed in claim 12, further comprising:

image modulation processing means for forming binary face images of each of said plurality of observers based on said observers' face images taken by said observers' face taking means and outputting formed binary face images to said observers' face images display means.

15. The stereoscopic display as claimed in claim 1, wherein said arrayed focusing means is selected from a group consisting of:

an arrayed convex lens;

an arrayed Fresnel lens;

an arrayed Selfoc lens; and a double integral lens array.

16. The stereoscopic image display device as claimed in claim 1, further comprising:

focusing means provided between a screen of said observers' face images display means and said plurality of observers, said focusing means being selected from a group consisting of:

a large convex lens, a Fresnel convex lens, a Selfoc lens, an arrayed Fresnel convex lens, and an arrayed Selfoc lens.

17. The stereoscopic display as claimed in claim 12, wherein:

said observers' face taking means includes a TV camera having an arrayed taking lens.

18. The stereoscopic display as claimed in claim 1, wherein:

said stereoscopic display is used as a display for a one-way communication system.

19. The stereoscopic image display device as claimed in claim 1, wherein:

said stereoscopic display is used as a display for a two-way communication system.

20. The stereoscopic display as claimed in claim 12, further comprising:

illuminating means provided on only one of a right side or a left side of said plurality of observers.

21. The stereoscopic display as claimed in claim 20, wherein:

said illuminating means is a non-visible light source.

22. A stereoscopic display comprising:

a display to selectively display a plurality of stereo-pairs, each of said stereo-pairs comprising right and left eye perspectives to be observed by a respective plurality of observers;

a backlight source disposed behind said display opposite said plurality of observers, said backlight source having variable regions which direct said plurality of stereo-pairs to respective ones and not the others of said right and left eyes of said plurality of observers; and a matrix lens array to direct said plurality of stereo-pairs to respective ones and not the other of said right and left eyes of said plurality of observers, and only to respective ones of said plurality of observers, said matrix lens array being provided on a plane from which said matrix lens array focuses an optical image of said plurality of observers substantially on a screen of said display in geometrical agreement with said variable regions of said backlight source.

23. A stereoscopic display comprising:

a display to selectively display a stereo-pair image comprising right and left eye perspectives to be observed by an observer;

a backlight source disposed behind said display opposite said observer, said backlight source having variable regions which direct said stereo-pair image to one and not the other of said right and left eyes of said observer; and a matrix lens array to direct said stereo-pair to a respective one and not the other of said right and left eyes of said observer, said matrix lens array being provided on a plane from which said matrix lens array focuses an optical image of said observer substantially on a screen of said display in geometrical agreement with said variable regions of said backlight source.

* * * * *